United States Patent
Bigelow et al.

(10) Patent No.: US 6,481,670 B1
(45) Date of Patent: Nov. 19, 2002

(54) APPARATUS FOR SPACECRAFT THERMAL MANAGEMENT

(75) Inventors: Robert T. Bigelow, Las Vegas; Russell J. Common, Henderson; John Mezits, Las Vegas; David A. Cavaleri, Henderson, all of NV (US)

(73) Assignee: Bigelow Aerospace Division, LLC, Las Vegas, NV (US)

(*) Notice: Subject to any disclaimer, the term of this patent is extended or adjusted under 35 U.S.C. 154(b) by 140 days.

(21) Appl. No.: 09/693,534

(22) Filed: Oct. 20, 2000

(51) Int. Cl.[7] ................................................. B64G 1/46
(52) U.S. Cl. ...................... 244/163; 244/158 R; 165/41
(58) Field of Search ............................... 244/163, 158 R, 244/173; 165/41

(56) References Cited

U.S. PATENT DOCUMENTS

| | | | | |
|---|---|---|---|---|
| 4,161,212 A | * | 7/1979 | Hightower | 126/634 |
| 4,492,266 A | * | 1/1985 | Bizzell et al. | 122/366 |
| 4,750,543 A | * | 6/1988 | Edelstein | 126/590 |
| 5,267,605 A | * | 12/1993 | Doty et al. | 165/133 |
| 5,954,298 A | * | 9/1999 | Basuthakur et al. | 165/41 |

FOREIGN PATENT DOCUMENTS

| | | | |
|---|---|---|---|
| FR | 2452078 | * | 11/1980 |
| JP | 406001300 | * | 1/1994 |

* cited by examiner

Primary Examiner—J. Woodrow Eldred
(74) Attorney, Agent, or Firm—Sierra Patent Group, Ltd.

(57) ABSTRACT

The present invention provides a thermal, and if desired, a radiation barrier to protect the exterior surface of a spacecraft. In particular, the present invention protects the polymeric materials of construction utilized in inflatable and expandable spacecraft from the deleterious effects of both thermal and radiation aging. The protective barrier is formed from a tube or tubes through which a fluid circulates. The tube segment substantially enclose the spacecraft, and in particular, the critical layers that are desired to be protected. This protective barrier provides a thermal heat sink, temperature equalization, and a waste heat rejection system, that can moderate the temperature extremes encountered by spacecraft. In addition, dependent on the fluid selected, substantial radiation shielding can be provided that can protect the entire spacecraft.

17 Claims, 10 Drawing Sheets

APPARATUS FOR SPACECRAFT THERMAL MANAGEMENT

BACKGROUND OF THE INVENTION

1. Field of the Invention

The present invention relates to the field of thermal barriers, insulation systems, and thermal control systems for orbiting satellite, space vehicles, space stations, and space modules, generally referred to as spacecraft. In particular, the present invention relates to a thermal management system capable of evenly distributing heat loads and maintaining a controlled, and nearly constant temperature distribution around the entire outer periphery of a spacecraft.

2. Discussion of the Prior Art

Spacecraft thermal control has been a long standing problem. Earth orbiting spacecraft receive direct solar radiation and experience significant heating and temperature buildup. Maintaining a uniform temperature across the spacecraft surface becomes even more problematic for those missions orbiting a sun tracking attitude. A sun tracking flight attitude causes one side of the spacecraft to be continuously exposed to the sun, and the opposite side to the darkness (and cold) of space. The surface temperature on the sun side of the spacecraft can reach over 300 degrees F., whereas the dark side may be lower than −200 degrees F.

Several different types of measures have been implemented to control thermal gain. These control measures can be classified as either passive or active. Among the most effective passive thermal control measures is multiple layer insulation (MLI). MLI is generally formed from multiple layers of reflective material that acts as a barrier and reflector to incident solar radiation. MLI effectively protects standard aluminum skinned spacecraft from solar thermal gain and attendant high spacecraft surface temperatures. Current MLI design practices, however, are not fully satisfactory for application to a new generation of spacecraft utilizing polymeric materials of construction.

Polymeric materials experience significant degradation at temperatures much lower then the safe working temperatures of metallic skinned spacecraft. Even slightly elevated temperatures will cause thermal degradation, and significantly shorten the service life of polymeric based spacecraft. Although current thermal insulation designs using MLI significantly reduce temperature extremes, the temperature sensitivity of polymeric materials demands a higher level of thermal stability to fully protect these materials from degradation.

The sensitivity of polymers to thermal aging has been researched and mathematical models have been developed to predict the degradation rate and service life of polymeric materials. Reduction of service life due to thermal affects can be estimated by a rough rule which projects a 50% reduction in service life for every 10 degree C. rise in temperature. A more sophisticated approximation of polymeric degradation can be obtained using the Arrhenius equation. This equation determines the service life of a specific polymer based on the ambient environmental temperature to which it is exposed, and the allowable reduction in a specific physical property. The rate of material degradation for a specific material and a specific material property is measured by its activation energy. With the activation energy and the nominal service life of a material, the reduced service life at any elevated temperature may be calculated. Calculations performed on various polymeric materials have shown a marked degradation in material mechanical properties with thermal aging and a concomitant reduction in service life.

In contrast to the elevated temperatures experienced on the sun side of the spacecraft, extremely cold temperatures are encountered on surfaces facing away from the sun. Although the MLI insulation can retard heat drain from these surfaces, eventually these surfaces will become very cold. At low temperatures, polymeric materials tend to become embrittled, inflexible, and are potentially at risk for failure.

It is evident that despite the presence of MLI, polymeric materials exposed to the temperature extremes of space will prematurely degrade and potentially fail well prior to the end of the materials potential service life. The prior art solutions for the control of surface temperature and thermal gain on metal skinned spacecraft are inadequate for this new generation of polymeric based spacecraft.

Compounding the thermal aging problem is the degradation of polymeric materials due to the spacecraft's exposure to cosmic and solar radiation. Polymeric materials age and degrade continuously with accumulated radiation exposure losing their mechanical strength.

Radiation doses that would leave metallic materials essentially unaffected, cause significant degradation to polymeric materials. The extremely high radiation levels associated with Solar Particle Events (SPE) are sufficient to cause serious degradation to polymeric materials. Even relatively low dose rates from normal levels of cosmic and solar radiation are a concern because material damage is a function of the accumulated dose received.

As discussed above, radiation exposure and elevated temperature stressors taken individually cause material degradation. Simultaneous exposure to these stressors, however, often produces a synergistic effect that greatly accelerates the aging process and produces significantly more damage to the material. Much of this synergistic activity is a result of radiation's propensity to initiate chemical reactions that would not otherwise occur due to thermal aging alone. Elevated temperatures help drive these reactions to completion. As a result, even low levels of radiation in combination with exposure to elevated temperatures will degrade most polymeric materials much faster than the application of either stressor alone. To prevent the unnecessary foreshortening of a spacecraft's service life due to these synergistic affects, it is preferable that the protective barrier shield polymeric materials from radiation damage as well as thermal aging.

Polymeric based spacecraft have significant service life limitations as a result of the imposition of thermal and radiation stressors. Despite intensive research into inflatable and expandable spacecraft constructed from polymeric materials, the importance of shielding such spacecraft from the synergistic affects of thermal and radiation aging has not been appreciated.

To deal with this degradation problem, a protective barrier is needed to moderate the spacecraft's surface temperature and protect the polymeric materials of construction from thermal degradation, cyclic thermal fatigue, and to maintain materials within their design temperature limits. In addition to thermal control, it is desirable for any such protective barrier to have the capability to shield sensitive materials from radiation damage. This is essential to help prevent materials degradation from accumulated radiation, as well as preventing synergistic degradative affects due to simultaneous exposure to thermal and radiation stressors.

SUMMARY OF THE INVENTION

The preferred embodiment of the present invention is adaptable to any spacecraft, but is most applicable and useful to inflatable and expandable type spacecraft that utilize polymeric materials of construction. Polymeric materials are much more susceptible to radiation and thermal damage than their metallic counterparts used in traditional spacecraft. These stressors can significantly shorten the service life of any polymeric based spacecraft. The most significant of these degradative affects is manifested in the loss of mechanical properties such as tensile strength, impact strength, and elongation.

Several spacecraft structural components are made from polymeric materials. These components include the restraint layer that forms the structure of the spacecraft, and the pressure membrane which prevents air leakage. Degradation in either of these two components may cause a life threatening failure in the spacecraft, or reduce the spacecraft's safety factor to an extent that makes it unusable. Because these components are critical to the operation of the spacecraft and are not easily replaceable, they must be protected from thermal and radiation aging in order to achieve a satisfactory service life.

Clearly, the affects of these aging stressors can have a profound affect on the economic viability of any spacecraft utilizing polymeric materials of construction. The service life of a polymeric spacecraft may be severely compromised with even a slight elevation in temperature. To prevent this unnecessary reduction in service life, a protective barrier is needed to attenuate, if not eliminate, thermal and radiation damage, and stop the premature degradation of the spacecraft's polymeric materials of construction.

The protective barrier of the present invention is a system of fluid filled tubes that surrounds and protects the spacecraft's critical components. The barrier provides two protective functions for the spacecraft; a thermal control system and a radiation shield. The tubes are preferably placed in contact with each adjacent tube to continuously cover the spacecraft and to provide maximum radiation and thermal protection. The circulating fluid maintains an optimum temperature uniformly across a surface or layer of the spacecraft. The protective barrier maintains the critical polymeric components well within their service temperature limits, and at the lowest practical temperature to minimize thermal aging.

The circulating fluid also provides a heat sink not only for incident solar radiation, but also for internally generated waste thermal energy. Incident solar radiation is absorbed into the heat sink before it can affect the spacecraft's critical components. Internally generated waste heat can be transferred, either directly, or indirectly with heat exchangers, to the circulating fluid. The thermal energy in the circulating fluid is rejected by connecting, directly or indirectly, to thermal radiators. The thermal radiators reject waste heat into space. Tubing facing the dark side of space itself may act as a radiator, directly rejecting heat into space.

The other function of the fluid barrier is to provide radiation shielding for the spacecraft's critical polymeric materials. When a liquid such as water is used as the primary fluid, the present invention is able to substantially shield the spacecraft from radiation. The water filled tubular sections, together with the tubing material itself, provides a radiation shield (when organized without gaps) over the surface of the spacecraft. The degree of shielding provided by the present invention may be adjusted by changing the diameter of the tubing and/or the number of overlapping tube layers. In general, a two to three inch layer of water is sufficient to protect the spacecraft and crew against normally occurring levels of space radiation.

The present invention, with its capability to protect critical polymeric components from thermal and radiation aging and prevent premature degradation, can extend the service life of polymeric based spacecraft. This represents a significant improvement in economic viability for this type of spacecraft.

DETAILED DESCRIPTION OF THE PREFERRED EMBODIMENTS

Preferred embodiments of the present invention that illustrate the best modes now contemplated for placing the invention in practice are described as follows, and in conjunction with the attached drawings that form a part of this specification. The preferred embodiments are described in detail without attempting to show all of the various forms and modifications in which the present invention may be embodied. The preferred embodiments described are illustrative, and as will become apparent to those skilled in the arts, can be modified in numerous ways within the spirit and scope of the invention, the invention being measured by the appended claims and not by the details of the specification.

The present invention is a protective barrier that shields sensitive polymeric materials of construction used in advanced spacecraft design against thermal and radiation aging. The importance of the present invention is that it prevents material degradation ensuring the longest possible service life for polymeric based space craft.

Figure 1:
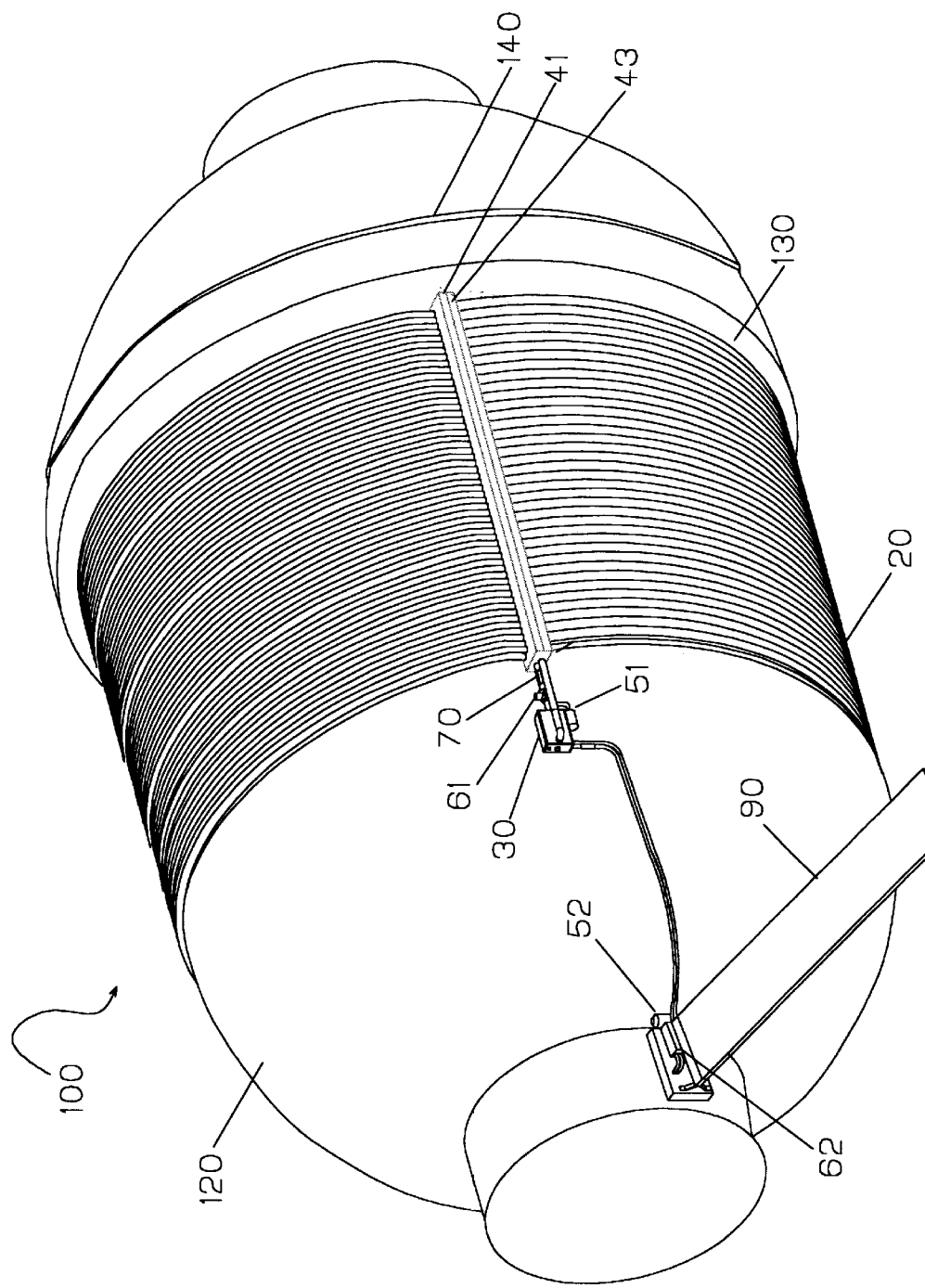
FIG. 1 is a cut away view through a typical inflatable polymeric based spacecraft showing the spacecraft thermal management apparatus (w/multiple flow path tubing).
Figure 2:
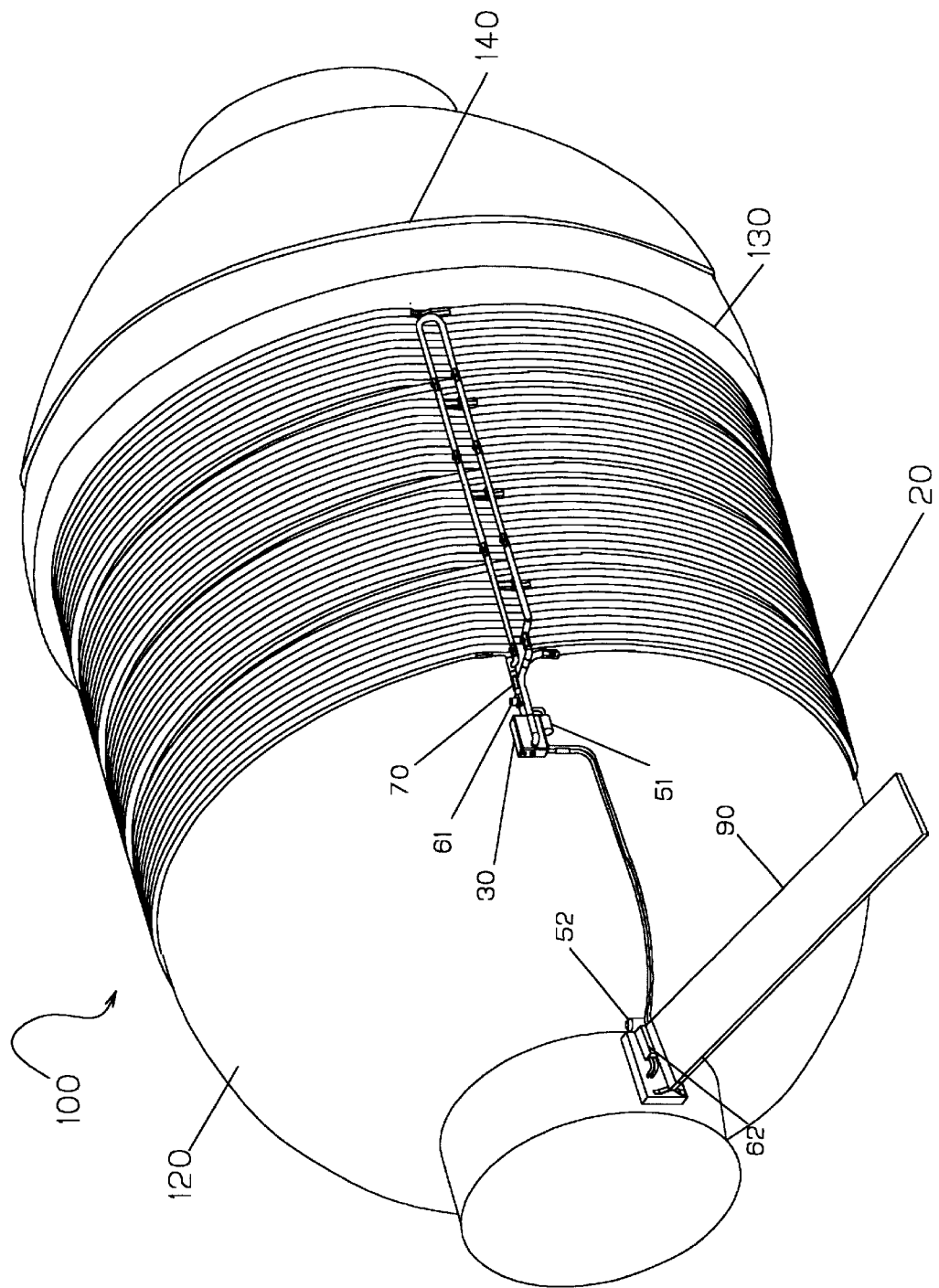
FIG. 2 is a cut away view through a typical inflatable polymeric based spacecraft showing the spacecraft thermal management apparatus (w/single flow path tubing).
Figure 3:
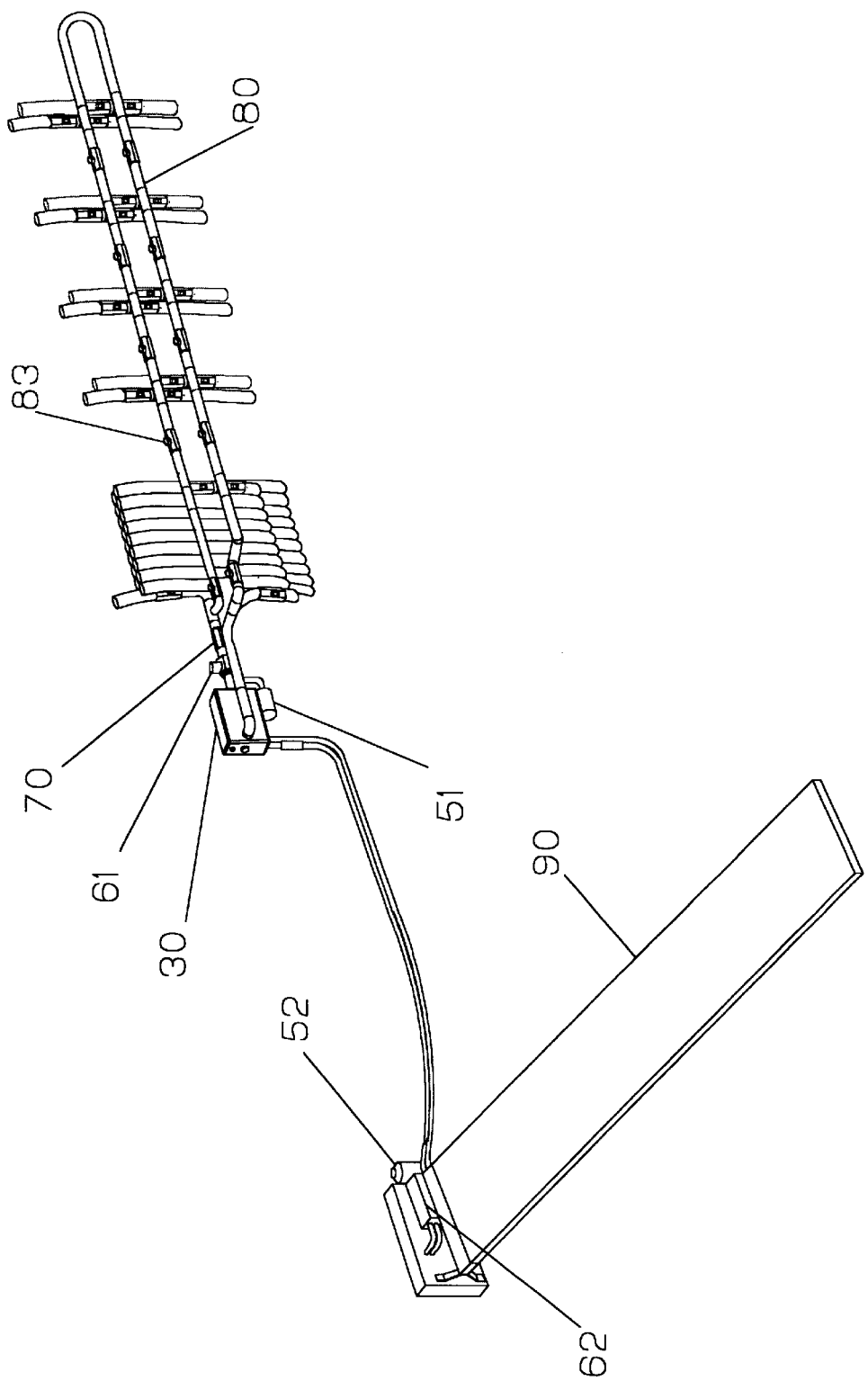
FIG. 3 is an isometric view of the spacecraft thermal management apparatus shown in FIG. 2.
Figure 4:
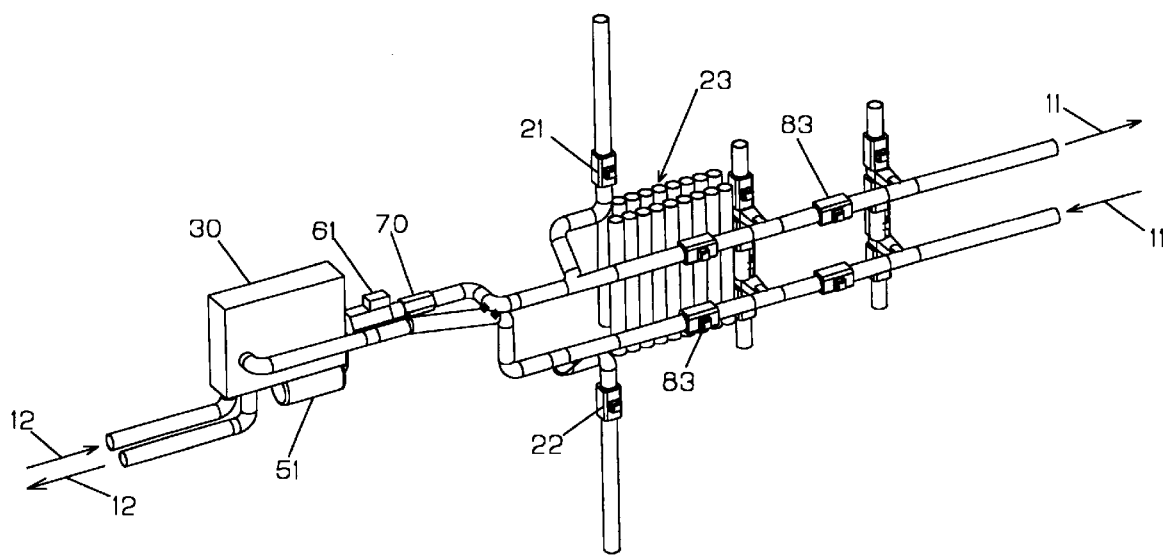
FIG. 4 is an isometric view of the spacecraft thermal management apparatus's first and last tubing segments.
Figure 5:
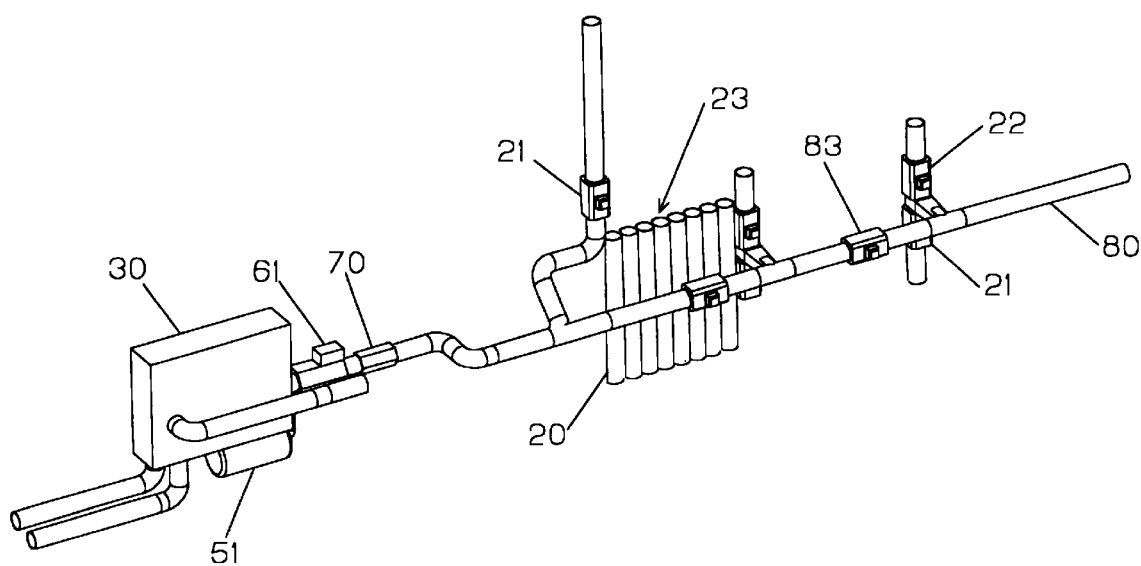
FIG. 5 is an isometric view of the spacecraft thermal management apparatus's first tubing segment.
Figure 6:
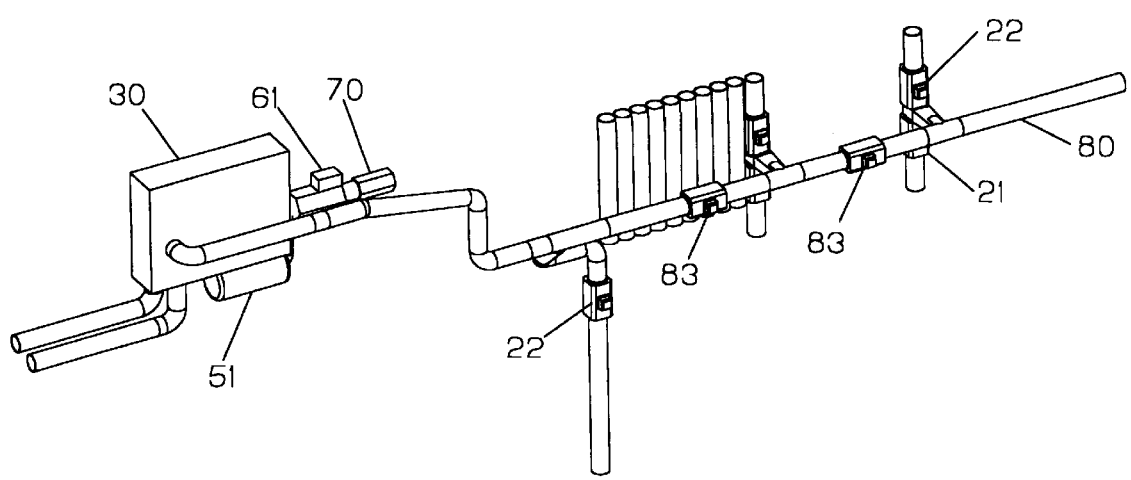
FIG. 6 is an isometric view of the spacecraft thermal management apparatus's last tubing segment.
Figure 7:
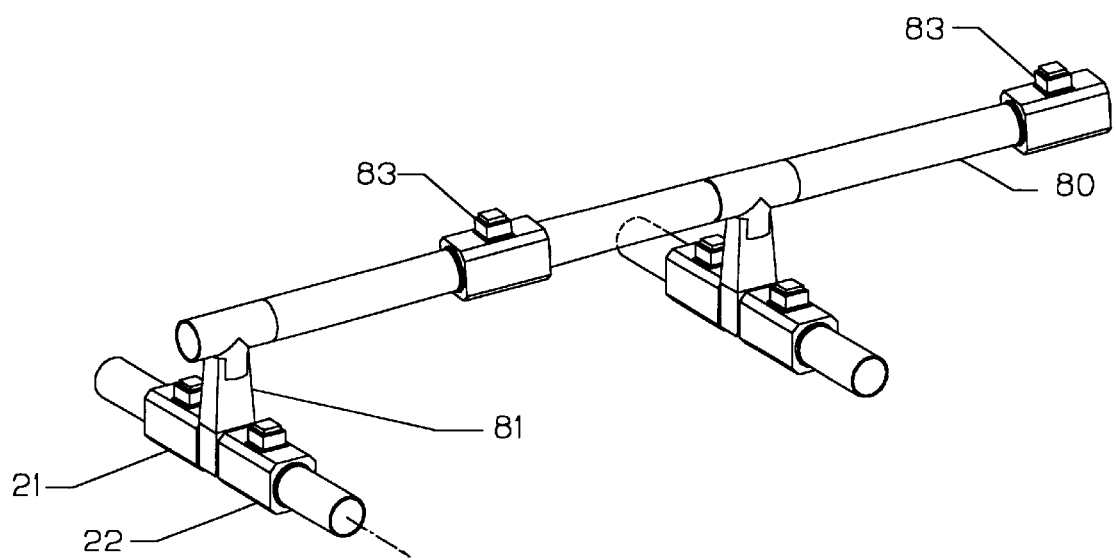
FIG. 7 is an isometric view of a portion of the spacecraft thermal management apparatus's bypass line as it connects to a tubing segment forming a junction.
Figure 8:
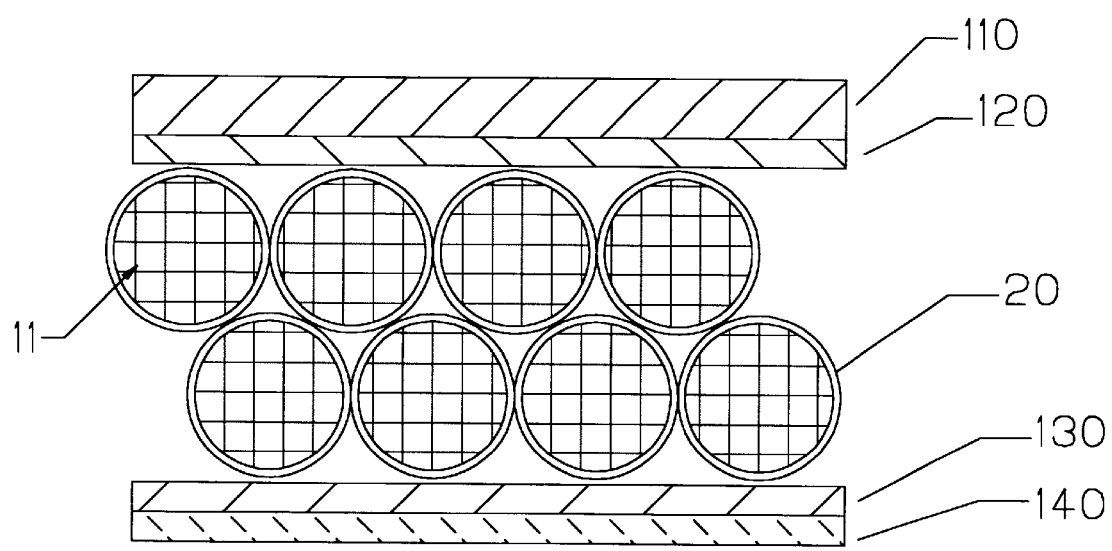
FIG. 8 is a cross sectional view of a typical inflatable spacecraft wall showing the fluid filled tubes used in the spacecraft thermal management apparatus.

FIG. 1 and FIG. 2 depict the present invention with the protective barrier installed in a typical inflatable spacecraft 100. This type of spacecraft has a number of different component layers, forming a number of spacecraft surfaces. These layers include the multiple insulation layer (MLI) 140, a micrometeorite protection layer (MMOD) 130, the restraint layer 120, and the pressure membrane 10. It is understood that the spacecraft depicted in FIG. 1 and FIG. 2 is but one of any number of possible variations in space craft design that use polymeric materials to form the spacecraft's pressure retaining boundary.

The MLI 140, because it shields the spacecraft from the brunt of solar radiation, is generally the spacecraft's outermost layer. The MLI and the MMOD layers are easily replaceable in the event there is degradation in these layers. Consequently, it is not necessary nor desirable for the protective barrier to shield the MLI or MMOD.

In the case of the typical inflatable spacecraft, the restraint layer is the outermost layer that requires protection. The pressure membrane 110, which also requires protection, is generally located interior to the restraint layer 120. Consequently, the preferred location for the protective barrier is exterior to the air barrier and restraint layers, but inside the MMOD and MLI layers. The barrier, however, may be placed anywhere in relation to the spacecraft, provided it is placed to protect the desired components.

Figure 9:
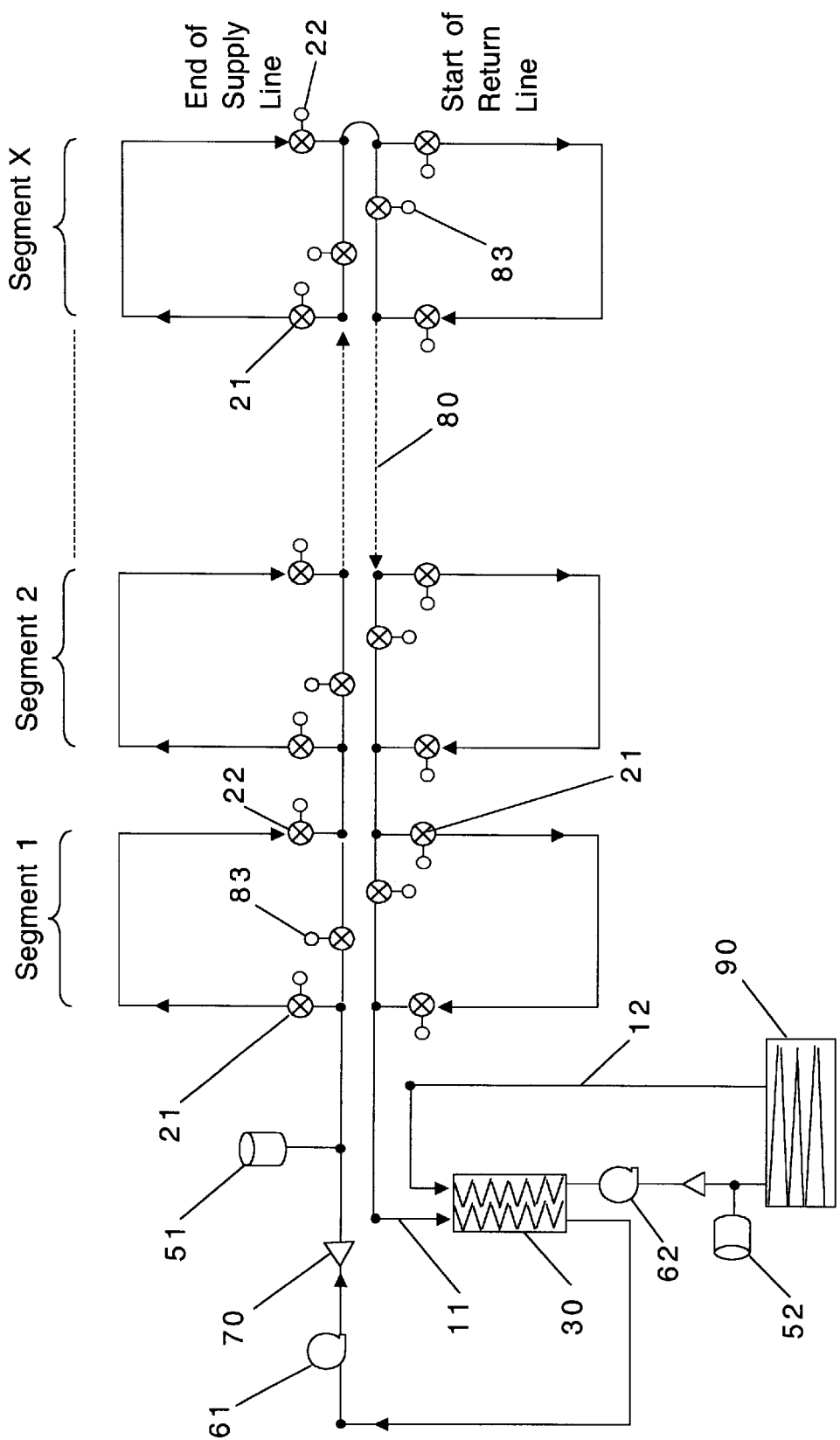
FIG. 9 is a schematic of the second embodiment of the spacecraft thermal management apparatus using a single length of tube.
Figure 10:
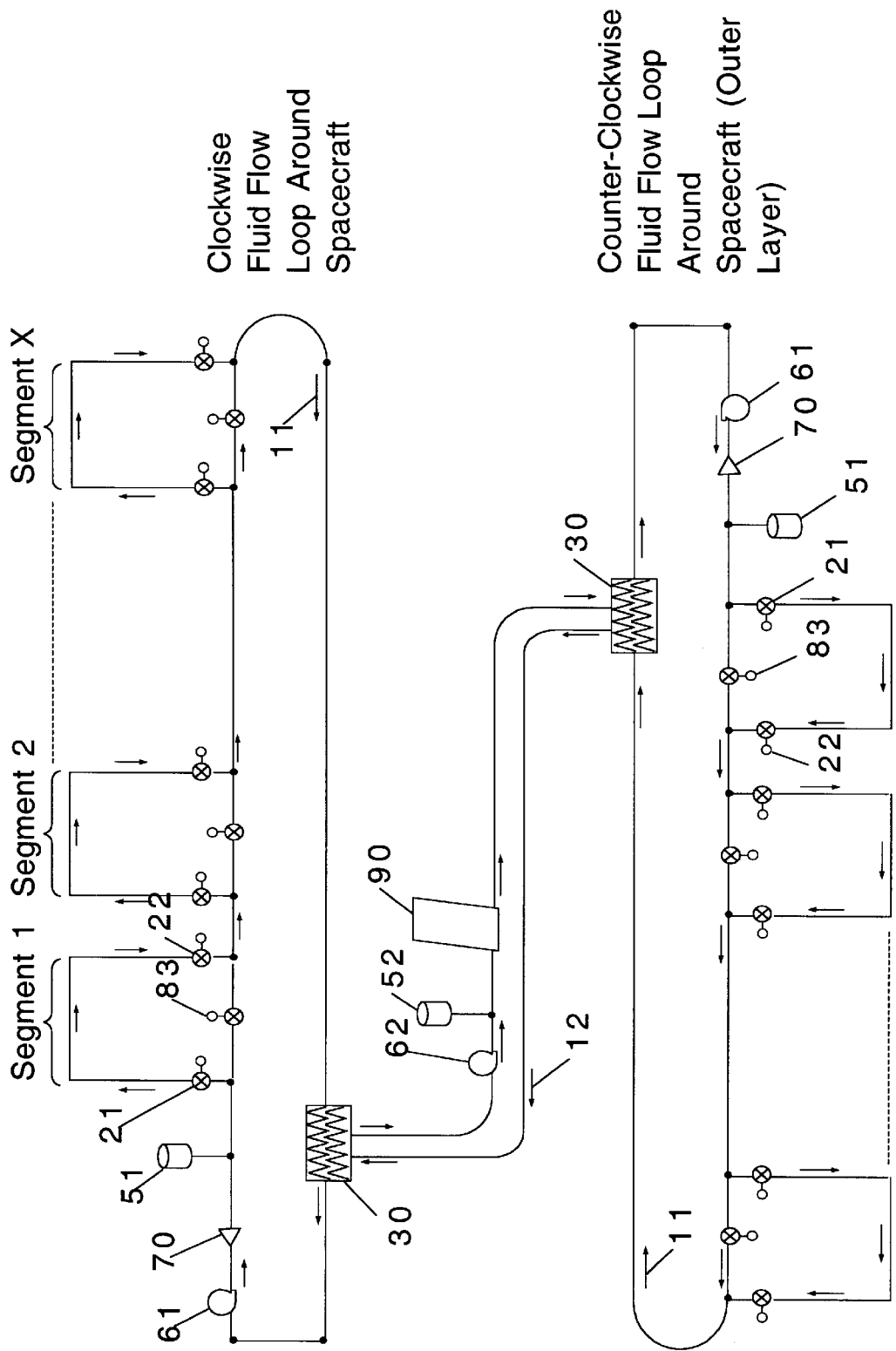
FIG. 10 is a schematic of the third embodiment of the spacecraft thermal management apparatus using two separate lengths of tube, the fluid in these two tubes flowing in opposing directions.

FIG. 1, FIG. 2, and FIG. 9 illustrate the preferred placement of the protective barrier in relation to standard components of construction used to form the exterior of most inflatable spacecraft. The tubing 20 can be seen between the restraint layer 120 and the MMOD 130. In this position the protective barrier shields all age susceptible, non replaceable spacecraft components (restraint layer 120 and the gas membrane 110) critical to the space module. This position also allows the MMOD layer to protect the fluid filled tubes from micrometeorite damage and fluid loss.

The barrier consists of a fluid filled tube 20 that substantially surrounds and encloses the outermost spacecraft layer that requires thermal or radiation protection. This tubing may be made from any number of separate tubes, or if desired, may be a single length of tube. The tubing may form a single continuous flow path, or may consist of a number of separate flow paths. Any number of tube layers may be built up to provide a thicker barrier with greater protective capability. To compensate for the additional volume that the tubes require, the tubes may be collapsible, (like a fire hose), to minimize launch volume. The tubing is preferably a polymer such as polyethylene. A polymer tube eliminates corrosion concerns, facilitates the design of a collapsible tube, and allows the tubing to be extruded in larger component assemblies. A polymer may also be selected for its capability to stop radiation.

Although the protective barrier is itself susceptible to the same degradation problems as the restraint layer and the air barrier, the present invention has been designed for easy repair and replacement if necessary. The barrier is accessible through the MLI and the MMOD layers and may be replaced in segments.

The tubes preferably lie in the direction of the spacecraft's surface temperature gradients to maximize temperature exchange between the hot and cold surfaces contacted by the tubes. This ensures that spacecraft materials are kept within an optimum temperature band, as well as within maximum and minimum temperature limits.

The first embodiment of the present invention is shown in FIG. 1. The fluid barrier consists of a plurality of tubes 20 connected together by a common supply manifold 41 and return manifold 43. This tubing creates a number of different flow paths. Valves may be installed in these tubes or in the manifolds to isolate flow from any single section.

In a second embodiment, as shown in FIG. 2, the fluid barrier consists of a single continuous flow path formed by a tube wrapped around the spacecraft in a single, or multiple layers. The direction of the tube (and consequently the fluid flow) may be in any direction in these multiple layers. In its simplest form, one end of tube 20 connects to the discharge port of the primary pump 61 and the other end connects with the suction port of the primary pump 61.

A bypass line 80 is used to isolate a leak in a tube segment 23 and allow continued partial operation of the system. The inlet end of the bypass line 80 is connected prior to the first junction and the outlet end of the bypass line is connected after the last junction. In addition, the bypass line 80 connects with the tube 20 at regular intervals to form a junction 81. At these junctions, fluid has the potential to flow into the bypass line, or to continue along the same fluid flow path in the tube. A tube segment 23 is defined by the length of tube contained between a first junction and the immediately following second junction. Inlet and outlet valves 21, 22, may be placed in each tubing segment to isolate fluid flow into and out of each tube segment 23. In a tube segment 23, the inlet valve 21 is placed immediately after the first junction, and the outlet valve 22 is placed immediately before the second junction. The inlet and outlet valves may be used to isolate a tube segment and reroute fluid from the previous tube segment into the bypass line. The bypass line is capable of carrying fluid past isolated tube segments to the next available open tube segment. Bypass valves 83 may be placed in the bypass line between the junctions to control fluid flow in the bypass line. All the bypass valves are normally shut, and are only opened to allow fluid to flow around an isolated tube segment.

The third embodiment has two primary flow trains essentially identical to the second embodiment. Whereas the inner and outer layer of the first embodiment is a single run of tubing, the third embodiment uses two separate primary fluid flow loops. Each primary fluid flow loop is formed by a primary flow train with the requisite ancillary equipment to circulate the primary fluid. The primary flow path transfers heat to the secondary flow train. The secondary flow train rejects heat through thermal radiators into space. This provides complete redundancy, and helps ensure that at least a portion of the system always remains operable.

This third embodiment allows fluid circulation in the tubes to be used as an attitude control device. The attitude of the spacecraft may be controlled, in at least one axis, through the adjustment of the pump flow rates in either the outer loop, inner loop , or in both loops. The two loops may also be arranged to flow in opposing directions to provide maximum attitude control. The momentum change due a change in fluid circulation flow velocity will induce a torquing moment on the spacecraft, providing attitude adjustment. In the nominal attitude position, the fluid flow paths in the two tubes may be in opposite directions to prevent a moment from being applied to the spacecraft.

OPERATIONAL DESCRIPTION

Based on the above description of the preferred physical embodiments of the protective barrier, the following provides a general description of how the barrier functions in a space environment. The tubing 20 forming the protective barrier is the collector and distributor of thermal energy around the spacecraft. Most of this thermal energy is heat from incident solar radiation. This heat is transferred to the protective barrier. Internally generated waste heat may be transferred to the tubing either directly or indirectly with heat exchangers. A pump 61, (such as a centrifugal pump, or a positive displacement pump such as a piston pump, or a peristaltic pump) having a first port and a second port, these ports to accept fluid into the pump and discharge tit for circulation through the tubes. The circulating fluid to equalizes the surface temperature across the spacecraft surfaces, bringing these surface temperatures into temperature equilibrium. As the fluid circulates, it carries heat from the spacecraft surface to thermal radiators, which radiate the excess heat into space.

In the first embodiment, heat rejection and thermal equalization starts with the discharge of primary fluid 11 from the discharge port of primary pump 61. The primary fluid 11 is directed into the supply manifold 41. The supply manifold 41 directs fluid flow into the inlet of the tube 20. As the fluid flows around the spacecraft, the fluid absorbs heat from both incident solar radiation and internally generated heat from the spacecraft interior. The primary fluid is then discharged into the return manifold 43. From the return manifold 43 the primary fluid 11 may be sent directly to a thermal radiator, such as a flat plate thermal radiator 90 or heat pipe to radiate excess thermal energy into space. The tubes themselves may be used as the thermal radiator if they can be directed outward from the dark side of the spacecraft. From the thermal radiator the fluid is returned to the suction port of primary pump 61. Rather than sending the fluid directly to a thermal radiator 90, it is preferably to send the primary fluid to a heat exchanger 30 to create a separate heat rejection loop.

In the preferred embodiment, a separate heat rejection loop (created by heat exchanger 30) is used to provide separation between fluid systems. This facilitates the isolation of system components for maintenance as well as system isolation in the event of a leak. This design also allows fluids to be optimally selected to match their thermal properties with their operating service conditions and their functional requirements. Water is utilized as the primary fluid in the preferred embodiment for its radiation shielding capability. A non-freezing fluid such as Freon, or ammonia is used in the preferred embodiment for the secondary fluid 12, in the secondary loop connected to the thermal radiator.

The heat exchanger 30 has a primary side connected to the tubing 20, and a secondary side connected to the thermal radiator 90. The circulation loop starts with the return manifold directing the heated primary fluid 11 to the heat exchanger 30. From the heat exchanger the primary fluid enters the primary pump 61 and is directed back to the supply manifold 41, where the recalculation process continues. From the heat exchanger 30, the secondary fluid 12 enters the suction port of a secondary pump 62. The secondary pump 62 circulates the secondary fluid 12 through the thermal radiator 90 where waste heat is rejected into space. The secondary fluid 12 exits the thermal radiator 90 and returns to the heat exchanger 30.

The second and third embodiments of the present invention work in basically the same way as the first embodiment described above. The chief difference between the embodiments is the use of a single tube flow path (with the possibility of a bypass line) in contrast to the multiple tube flow paths in the first embodiment. In the second embodiment, the primary fluid flow path extends from the primary pump 61, into tube 20, through the thermal radiator 90, and back to the primary pump. The primary fluid flow path around the tubing and enters a radiator to reject excess thermal energy. From the thermal radiator the primary fluid returns to the primary pump for recirculation.

As discussed above a heat exchanger may be used in combination with these embodiments to form two separate flow paths. In this embodiment the primary fluid flow path extends from the primary pump 61 through the tube 20, through the primary side of the heat exchanger 30, back to the primary pump. The secondary fluid flow path extends from the secondary side of the heat exchanger 30 to the secondary pump 62, to the thermal radiator, back to the secondary side of the heat exchanger.

A bypass line 80 may be used to isolate portions of the tube 20 in the event of leakage and yet still allow the remainder of the system to remain functional. A tubing segment 23 may be isolated by closing inlet valve 21 and outlet valve 22 of a selected tubing segment 23. Primary fluid flow will not be able to enter this tubing segment. A bypass valve 83 may be opened to allow primary fluid flow to be diverted around the isolated tube segment 23 into the next available tube segment. As described for the first embodiment, a heat exchanger 30 may be utilized to form two separate flow loops, or sent directly to a thermal radiator.

A primary and a secondary accumulator 51,52 may be used to pressurize the system to compensate for changing volume as fluid temperature changes. These accumulators also exert pressure on the system to maintain the necessary net positive suction head on the primary and the secondary pumps. Check valves 70 may also be placed in the system to ensure that the accumulators maintain the required pressure at the pump suction ports, regardless of the pump's cycle position.

Although the preferred embodiment of the present invention utilizes forced fluid flow, closed loop circulation system to maximize thermal efficiency, the present invention does not require a forced fluid flow system. Instead, the present invention can rely on conduction and radiation to achieve thermal distribution and equalization around the spacecraft. The lack of forced fluid flow however makes the transfer of heat much less efficient. Furthermore, the forced fluid flow embodiment provides an opportunity to clean the primary fluid stream.

Water in the barrier will quickly stagnate and provide a haven for a variety of biological organisms. This water requires recirculation through the appropriate filtering media and conditioning systems to keep it free from biological organisms. Consequently, the desirability of circulating fluid through the system to obtain efficient heat transfer is complemented by the desirability to use the same forced fluid flow to clean up the fluid.

To increase serviceability, maintainability, and reliability many of the major mechanical components may be located on the inside of the spacecraft. These components include the heat exchanger 30, the pumps, the accumulators. Because these components are connected with primary and secondary fluid lines, these systems may be charged up or let down as required. Access to the primary fluid (preferably water) provides multi-use capability and flexibility as needed to the crew, and or, other spacecraft.

With the present invention the spacecraft exterior surfaces and inner layers can be maintained at an optimum temperature. The present invention will also simultaneously shield the spacecraft from radiation. As a result, the spacecraft is free from the deleterious affects of thermal and radiation aging, maximizing the service life of the spacecraft. In addition, the present invention can provide significant protection to the spacecraft crew from normally encountered levels of radiation.

The present invention has been described above with reference to certain preferred embodiments. It is understood that modifications and variations are possible within the scope of the appended claims that follow.

We claim:

1. Apparatus for spacecraft thermal management comprising:
   a. a thermal radiator to reject heat;
   b. a pump, said pump having a first port and a second port, the first port of said pump connected to said thermal radiator;
   c. a tube, said tube substantially covering a surface of the spacecraft, one end of said tube connected to the second port of said pump, the other end of said tube connected to said thermal radiator, said tube, said thermal radiator, and said pump in fluid communication to form a continuous fluid flow loop, and
   d. a fluid, said pump circulating said fluid through the fluid flow loop;
   whereby the fluid flow in said tube controls the spacecraft's surface temperature.

2. Apparatus for spacecraft thermal management as described in claim 1 further comprising an accumulator, said accumulator to pressurize said fluid.

3. Apparatus for spacecraft thermal management as described in claim 2 further comprising:
   a. a bypass line, said bypass line and said tube connecting to form a plurality of junctions at spaced intervals along the length of said bypass line and said tube, the junctions allowing fluid communication between said tube and said bypass line, the length of said tube between junctions forming a tube segment;
   b. an inlet valve for each tube segment, each said inlet valve positioned in said tube;
   c. an outlet valve for each tube segment, each said outlet valve positioned in said tube, said inlet valve and said outlet valve in each tube segment for selectively isolating the tube segment from fluid communication with said bypass line and the remainder of said tube;
   d. said bypass line further having an inlet and an outlet, the inlet of said bypass line connected to said tube before the first junction, and the outlet of said bypass line connected to said tube after the last junction;
   whereby a tube segment may be isolated, and yet still allow fluid flow through the remainder of said tube.

4. Apparatus for spacecraft thermal management as described in claim 3 further comprising a bypass valve for each tube segment, said bypass valve located in said bypass line between junctions.

5. Apparatus for spacecraft thermal management comprising:
   a. a heat exchanger, said heat exchanger having a primary side and a secondary side;
   b. a primary pump, said primary pump having a first port and a second port, the first port of said primary pump connected to the primary side of said heat exchanger
   c. a tube, said tubing substantially covering a surface of the spacecraft, one end of said tube connected to the second port of said pump and the other end of said tube connected to the primary side of said heat exchanger, said tube, said primary pump, and the primary side of said heat exchanger in fluid communication to form a primary fluid flow loop;
   d. a primary fluid, said primary fluid circulated by said primary pump through the primary fluid flow loop;
   e. a thermal radiator, said thermal radiator connected to the secondary side of said heat exchanger;
   f. a secondary pump, said secondary pump having a first port and a second port, the first port of said secondary pump connected to said thermal radiator, the second port of said secondary pump connected to the secondary side of said heat exchanger, said secondary pump, said thermal radiator, and the secondary side of said heat exchanger in fluid communication to form a secondary fluid flow loop; and
   g. a secondary fluid, said secondary fluid circulated by said secondary pump through the secondary flow loop;
   whereby the primary fluid flow in said tube controls the spacecraft's surface temperature.

6. Apparatus for spacecraft thermal management as described in claim 5 further comprising a primary accumulator, said primary accumulator to pressurize said primary fluid.

7. Apparatus for spacecraft thermal management as described in claim 6 further comprising a secondary accumulator, said secondary accumulator to pressurize said secondary fluid.

8. Apparatus for spacecraft thermal management as described in claim 7 further comprising:
   a. a bypass line, said bypass line and said tube connecting to form a plurality of junctions at spaced intervals along the length of said bypass line and said tube, the junctions allowing fluid communication between said tube and said bypass line, the length of said tube between junctions forming a tube segment;
   b. an inlet valve for each tube segment, each said inlet valve positioned in said tube;
   c. an outlet valve for each tube segment, each said outlet valve positioned in said tube, said inlet valve and said outlet valve in each tube segment for selectively isolating the tube segment from fluid communication with said bypass line and the remainder of said tube; and
   d. said bypass line having an inlet end and an outlet end, the inlet end of said bypass line connected to said tube before the first junction, the outlet end of said bypass line connected to said tube after the last junction;
   whereby the tube segment may be isolated and yet still allow fluid flow through the remainder of said tube.

9. Apparatus for spacecraft thermal management as described in claim 8 further comprising a bypass valve for each tube segment, said bypass valve located in said bypass line between said junctions.

10. Apparatus for spacecraft thermal management comprising:
    a. a plurality of tubes having a first end and a second end, said tubes substantially covering a surface of the spacecraft;
    b. a first manifold, the first end of said tubes connected to said first manifold;
    c. a second manifold, the second end of said tubes connected to said second manifold;
    d. a thermal radiator to reject heat, said thermal radiator connected to said second manifold;
    e. a pump, said pump having a first port and a second port, the first port of said pump said connected to said radiator, the second port of said pump connected to said first manifold;
    f. said pump, said thermal radiator, said first manifold, said second manifold, and said tubes all in fluid communication to form a fluid flow loop; and
    g. a primary fluid, said primary fluid circulated by said pump through said fluid flow loop;
    whereby the fluid flow in said tubes control the spacecraft's exterior surface temperature.

11. Apparatus for spacecraft thermal management as described in claim 10 further comprising an accumulator, said accumulator to pressurize said primary fluid.

12. Apparatus for spacecraft thermal management comprising:
   a. a plurality of tubes having a first end and a second end, said tubes substantially covering a surface of the spacecraft;
   b. a first manifold, the first of said tubes connected to said first manifold;
   c. a second manifold, the second of said tubes connected to said second manifold;
   d. a heat exchanger, said heat exchanger having a primary side and a secondary side, the primary side of said heat exchanger connected to said second manifold;
   e. a primary pump, said primary pump having a first port and a second port, the first port of said primary pump connected to said first manifold, the second port of said primary pump connected to the primary side of said heat exchanger, said primary pump, said first manifold, said tubes, said second manifold, and said heat exchanger all in fluid communication to form a primary fluid flow loop;
   f. a primary fluid, said primary fluid circulated by said primary pump through said primary fluid flow loop;
   g. a thermal radiator, said radiator connected to the secondary side of said heat exchanger
   h. a secondary pump, said secondary pump having a first port and a second port, the first port of said secondary pump connecting to said thermal radiator, the second port of said secondary pump connected to the secondary side of said heat exchanger, said secondary pump, said thermal radiator, and said tube in fluid communication to form a secondary fluid flow loop; and
   i. a secondary fluid, said secondary fluid circulated by said secondary pump through the secondary fluid flow loop;
whereby the primary fluid flow in said tubes controls the spacecraft's surface temperature.

13. Apparatus for spacecraft thermal management as described in claim 12 further comprising a primary accumulator, said primary accumulator to pressurize said primary fluid.

14. Apparatus for spacecraft thermal management as described in claim 13 further comprising a secondary accumulator, said secondary accumulator to pressurize said secondary fluid.

15. Apparatus for spacecraft thermal management comprising:
   a. at least two primary flow trains, each said primary flow train further comprising:
      i. a heat exchanger, said heat exchanger having a primary side and a secondary side;
      ii. a primary pump, said primary pump having a first port and a second port, the first port of said primary pump connected to the primary side of said heat exchanger
      iii. a tube, said tube substantially covering a surface of the spacecraft, one end of said tube connected to the second port of said pump and the other end of said tube connected to the primary side of said heat exchanger, said tube, said primary pump, and the primary side of said heat exchanger in fluid communication to form a primary fluid flow loop; and
      iv. a primary fluid, said primary fluid circulated by said primary pump through the primary fluid flow loop;
   b. a secondary flow train, said secondary flow train further comprising:
      i. a thermal radiator, said thermal radiator connected to the secondary side of each said heat exchanger;
      ii. a secondary pump, said secondary pump having a first port and a second port, the first port of said secondary pump connected to said thermal radiator, the second port of said secondary pump connected to the secondary side of each said heat exchanger, said secondary pump, said thermal radiator, and the secondary side of each said heat exchanger in fluid communication to form a secondary fluid flow loop; and
      iii. a secondary fluid, said secondary fluid circulated by said secondary pump through the secondary flow loop;
whereby the fluid flow in said tubes control the spacecraft's exterior surface temperature.

16. Apparatus for spacecraft thermal management as described in claim 15 further comprising at least two primary accumulators, said primary accumulators to pressurize said primary fluid in each of said primary flow trains.

17. Apparatus for spacecraft thermal management as described in claim 16 further comprising a secondary accumulator, said secondary accumulator in said secondary flow train to pressurize said secondary fluid.

* * * * *